United States Patent [19]
Brashier et al.

[11] Patent Number: 5,363,423
[45] Date of Patent: Nov. 8, 1994

[54] QUICK RELEASE TOP NOZZLE ASSEMBLY

[75] Inventors: Raymond W. Brashier; Edmund E. DeMario, both of Columbia, S.C.

[73] Assignee: Westinghouse Electric Corporation, Pittsburgh, Pa.

[21] Appl. No.: 109,101

[22] Filed: Aug. 19, 1993

[51] Int. Cl.⁵ .................................................. G21C 3/32
[52] U.S. Cl. ...................................... 376/446; 376/449
[58] Field of Search ............... 376/446, 449, 353, 260, 376/438; 976/DIG. 65, DIG. 68

[56] References Cited

U.S. PATENT DOCUMENTS

| | | | |
|---|---|---|---|
| 4,064,004 | 12/1977 | Long et al. | 176/78 |
| 4,381,284 | 4/1983 | Gjertsen | 376/364 |
| 4,603,027 | 7/1986 | Wilson et al. | 376/446 |
| 4,631,168 | 12/1986 | Shallenberger et al. | 376/446 |
| 4,637,914 | 1/1987 | Boyle et al. | 376/353 |
| 4,687,619 | 8/1987 | Wilson et al. | 376/260 |
| 4,699,760 | 12/1987 | Shallenberger et al. | 376/446 |
| 4,702,882 | 10/1987 | Stucker | 376/446 |

*Primary Examiner*—Donald P. Walsh
*Assistant Examiner*—Meena Chelliah

[57] ABSTRACT

Disclosed is a quick release removable top nozzle assembly for use with a nuclear fuel element assembly. The top nozzle assembly disclosed herein is comprised of a top plate member, an enclosure frame and an adaptor plate having a plurality of spaced openings therein. A plurality of tubular insert support members each adapted to fit within a selected opening in the adaptor plate has an enlarged collar section adapted to contact and support the underside of the adaptor plate. The assembly also includes a plurality of quick release joints each adapted to fit within another selected opening in the adaptor plate. Each quick release joint has a tubular lock insert which fits within the selected opening of the adaptor plate. The upper portion of the tubular lock insert is provided with a circumferential groove below a plurality of lobes. A locking ring is retained in a recess in the top of the adaptor plate by a retainer ring. The locking ring is adapted to rotatably engage the circumferential groove and the lobes whereby rotation of the locking ring locks or releases the tubular lock insert from the opening in the adaptor plate and allows an easy locking or release of the entire top nozzle assembly from the rest of the nuclear fuel element assembly for easy replacement of a fuel rod.

11 Claims, 8 Drawing Sheets

(UNLOCKED) 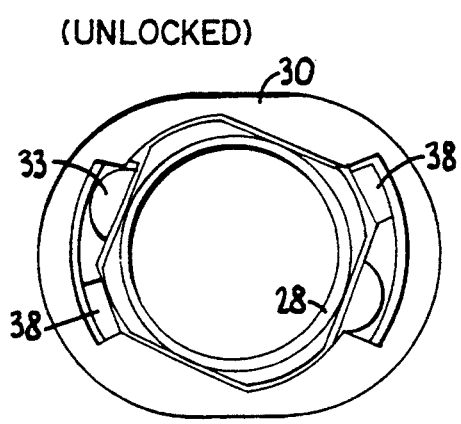 (LOCKED) 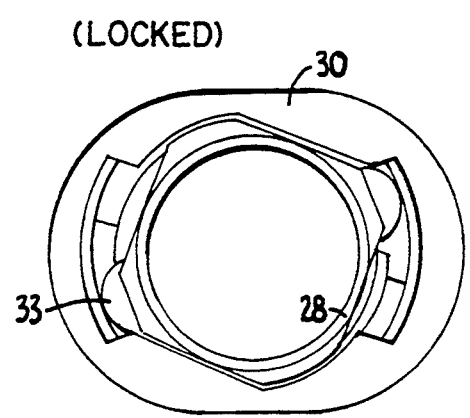
Fig. 4a.
Fig. 4b.

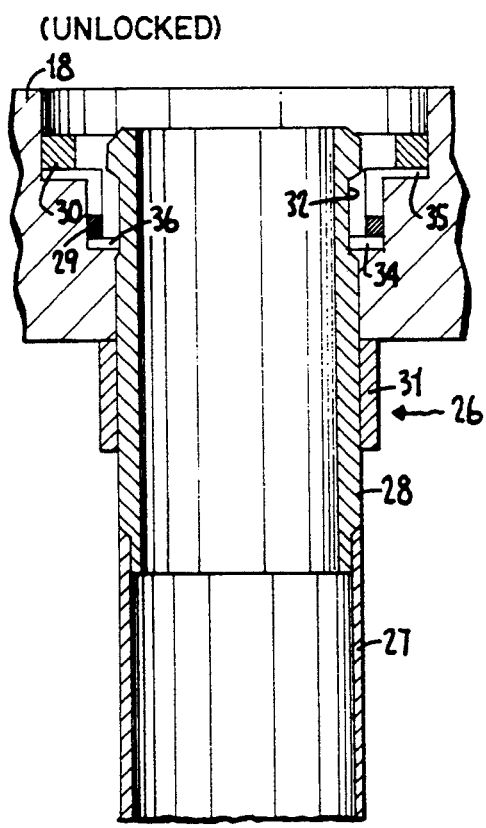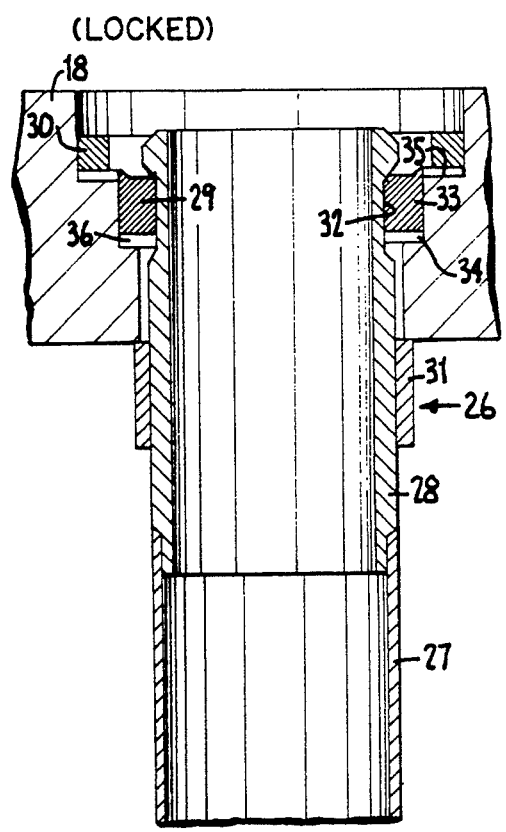
 

QUICK RELEASE TOP NOZZLE ASSEMBLY

BACKGROUND OF THE INVENTION

This invention relates to fuel element assemblies for nuclear reactors of the type used in pressurized water nuclear power stations. It relates particularly to a quick release top nozzle assembly for use in a fuel element assembly.

The fuel for a nuclear reactor of the type used in pressurized water nuclear power stations is a plurality of sintered cylindrical (about 0.4 inches [10.2 mm.] in diameter) uranium dioxide pellets stacked inside a long Zircalloy tube closed at both ends to form a fuel rod. Individual fuel rods, are inserted into cells of a series of spaced, parallel metal support grids joined together with thimble tubes. The grids typically arrange the fuel rods into a 14×14 or 17×17 square array, to comprise a fuel element assembly. A series of such fuel element assemblies are then arranged in parallel groups to comprise the core of the nuclear reactor.

When fuel element assemblies are in operation in a nuclear power plant, the fuel rods may become damaged and result in the escape of radioactive materials into the primary coolant in the reactor. If this occurs, the utility must remove the fuel element assembly containing the damaged fuel rod from the reactor to a separate location during the refueling outage, remove the damaged fuel rod from its particular grid cell in the fuel element assembly, insert a new fuel rod into the grid cell and then return the fuel element assembly back to its place in the reactor core. It is vital that such replacement of a damaged fuel rod be accomplished as easily and quickly as possible since fuel shuffles are usually on the critical path of the refueling outage.

Fuel element assemblies are usually provided with removable top nozzle assemblies that provide access to the individual fuel rods. A typical prior art removable top nozzle assembly is shown in FIGS. 1a and 1b, which illustrate the prior art removable top nozzle assembly unassembled in FIG. 1a, and assembled in FIG. 1b.

As shown in FIGS. 1a and 1b, the typical prior art removable top nozzle assembly 1 was comprised of a metal top adapter plate 2 having a bore 3 with a circumferential groove 4 adapted to receive a mating circumferential rib or bulge 7 on the slotted upper end of a metal tubular nozzle insert 5. The tubular nozzle insert 5 was retained in the bore 3 of the top adapter plate 2 by a ribbed metal lock tube 6 inserted into the top of the nozzle insert 5, as shown in FIG. 1b. The lower end of the nozzle insert 5 was provided with a plurality of spaced additional circumferential ribs or bulges 7 adapted to receive mating ribs or bulges 8 on a metal thimble tube 9 that fit into the lower end of the nozzle insert 5 and into an opening in the top grid support member 10 of the fuel assembly.

The typical prior art top nozzle assembly 1 illustrated in FIGS. 1a and 1b, presented several problems to the operator when replacing the fuel rods. First, removal of the top nozzle assembly 1 to permit the removal and replacement of the fuel rod was often difficult because of the force necessary to separate the adaptor plate 2 from the tubular nozzle inserts 5 was often excessive. Second, once the adaptor plate 2 was removed, the protruding tubular nozzle inserts 5 are left exposed and subject to possible damage during the fuel rod replacement operation. Third, the prior art top nozzle assembly designs required very careful alignment of the assembly components during reassembly and usually required special alignment tooling and procedures which often extended the time needed to replace a damaged fuel rod. Fourth, the prior art top nozzle assembly designs required excessive handling of the individual components making up the top nozzle assembly 1. For example, each lock tube 6 had to be removed individually from its nozzle insert 5 and carefully examined for possible damage prior to its replacement in the top nozzle assembly 1.

SUMMARY OF THE INVENTION

It is therefore an object of this invention to provide a top nozzle assembly for a nuclear fuel element assembly that allows for a quick and easy disassembly and reassembly of the various components without the need for using excessive force.

It is a further object of this invention to provide a top nozzle assembly that protects the tubular nozzle inserts from possible damage during the replacement of a fuel rod.

It is a still further object of this invention to provide a top nozzle assembly that does not require special alignment tooling and procedures for its reassembly.

It is another object of this invention to provide a top nozzle assembly that does not require excessive handling of the various components during the disassembly and reassembly for the replacement of a fuel rod.

It has been discovered that the foregoing objects can be attained by a quick release removable top nozzle assembly suitable for use with a nuclear fuel element assembly. The top nozzle assembly of this invention is comprised of a top plate member, an enclosure frame and an adaptor plate having a plurality of spaced openings therein. A plurality of tubular insert support members each adapted to fit within a selected opening in the adaptor plate has an enlarged collar section adapted to contact and support the underside of the adaptor plate. The assembly of this invention also includes a plurality of quick release joints adapted to fit within other selected openings in the adaptor plate. Each quick release joint has a tubular lock insert that fits within a selected opening in the adaptor plate. The upper portion of the tubular lock insert is provided with a circumferential groove below a plurality of lobes. A locking ring is retained in a recess in the top of the adaptor plate by a retainer ring. The locking ring is adapted to rotatably engage the circumferential groove and the lobes whereby rotation of the locking ring locks or releases the tubular lock insert with respect to the opening in the adaptor plate and allows an easy locking or release of the entire top nozzle assembly from the rest of the nuclear fuel element assembly to permit the easy replacement of a fuel rod.

BRIEF DESCRIPTION OF THE DRAWINGS

FIGS. 4a and 4b are enlarged partial top views of a portion of the removable top nozzle assembly of this invention showing the quick release top nozzle joint in its unlocked and in its locked positions.

FIGS. 5a and 5b are enlarged sectional views of a portion of the removable top nozzle assembly of this invention showing the quick release top nozzle joint in its unlocked and in its locked position.

DESCRIPTION OF THE PREFERRED EMBODIMENT

Figure 2:
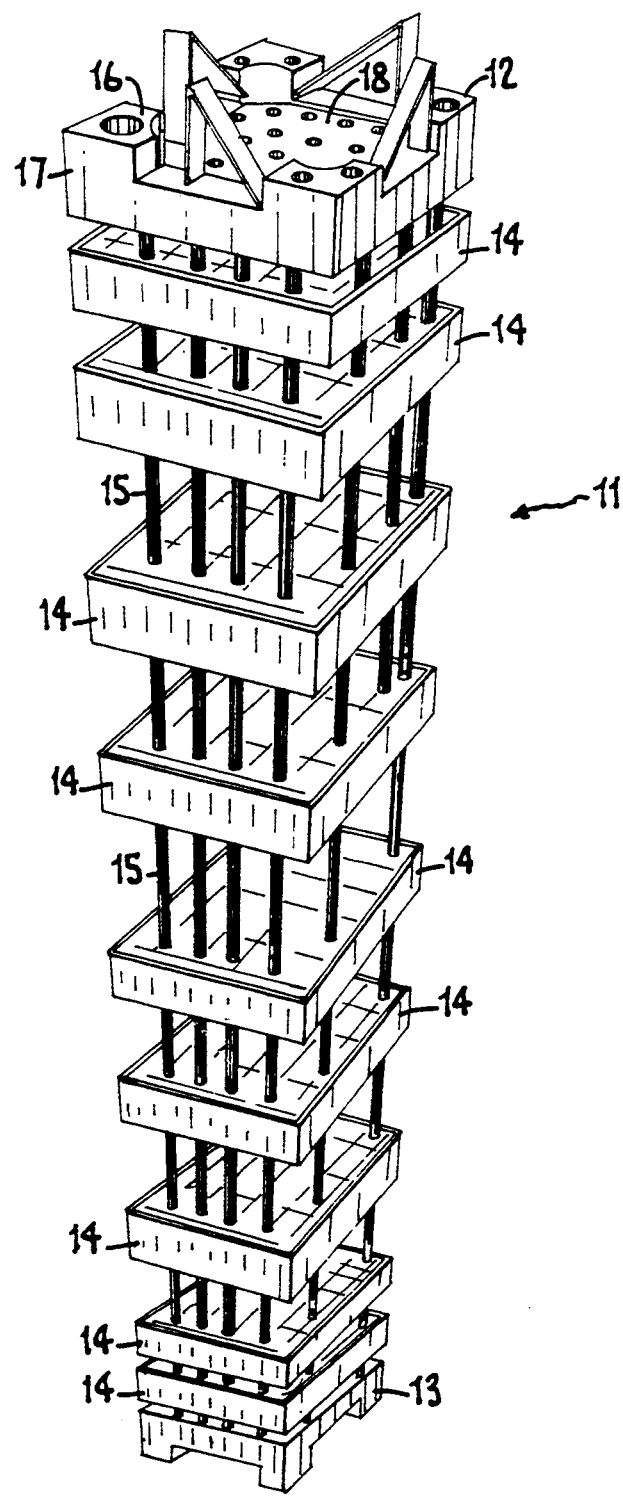
FIG. 2 is an isometric view of a typical fuel element assembly having a removable top nozzle assembly of this invention.

FIG. 2 illustrates a typical fuel element assembly 11 having a removable top nozzle assembly of this invention. The fuel element assembly 11 is generally comprised of a removable top nozzle assembly 12, a bottom nozzle assembly 13, and a plurality of metal support grids 14 having a plurality of aligned openings to receive and retain a plurality of elongated metal thimble tubes 15, providing a skeleton assembly to hold the individual fuel rods, in parallel groups or grids in a square array.

Figure 3:
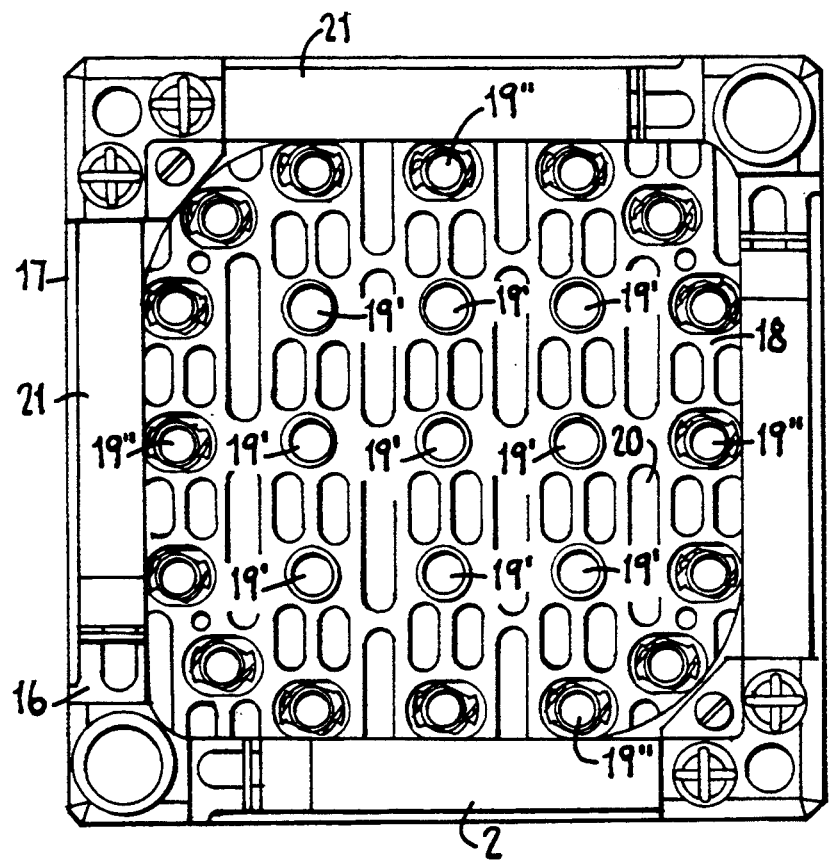
FIG. 3 is a top view of the removable top nozzle assembly of this invention.

FIG. 3 illustrates a top view of the removable top nozzle assembly 12 of this invention. The removable top nozzle assembly 12 is comprised of a square top plate 16, an enclosure frame 17 that surrounds and supports the periphery of a square, thick adaptor plate 18 having a plurality of circular openings 19 above the fuel rods and a plurality of elongated openings 20 to allow for the circulation of the primary cooling water around the fuel element assembly 11. Each side of the top plate 16 is provided with spring members 21 which hold the adaptor plate 18 tightly against the enclosure frame 17. All the components of the removable top nozzle assembly of this invention are preferably made of stainless steel or other suitable metal alloys.

Figure 7:
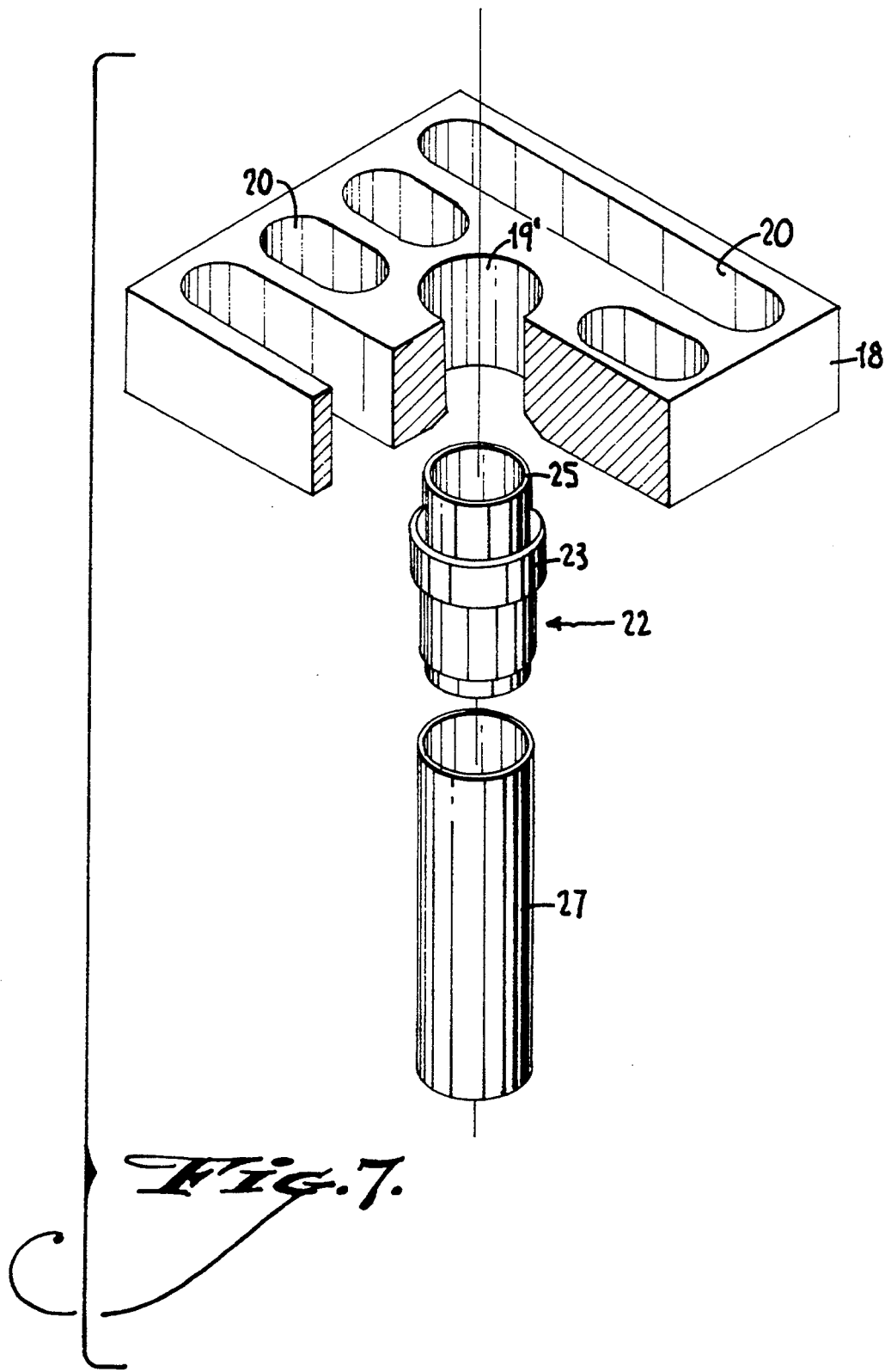
FIG. 7 is an isometric exploded view, partly in section, of a portion of the removable top nozzle assembly of this invention to illustrate the components of the top nozzle tubular insert support member.
Figure 8:
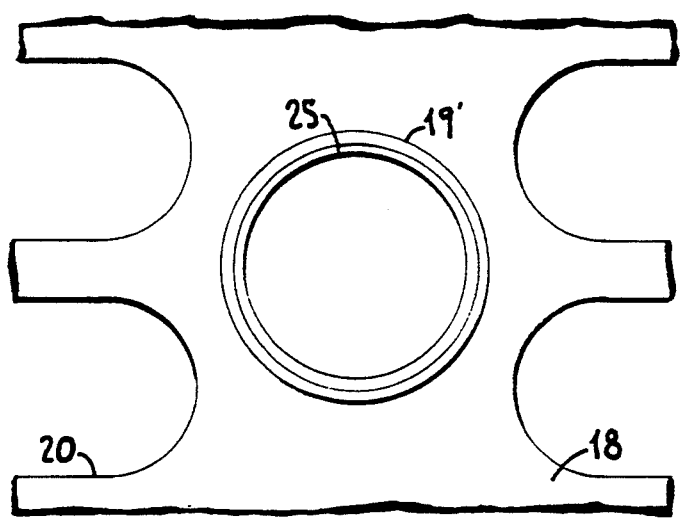
FIG. 8 is an enlarged partial top view of a portion of the removable top nozzle assembly of this invention showing the top nozzle tubular insert support member.
Figure 9:
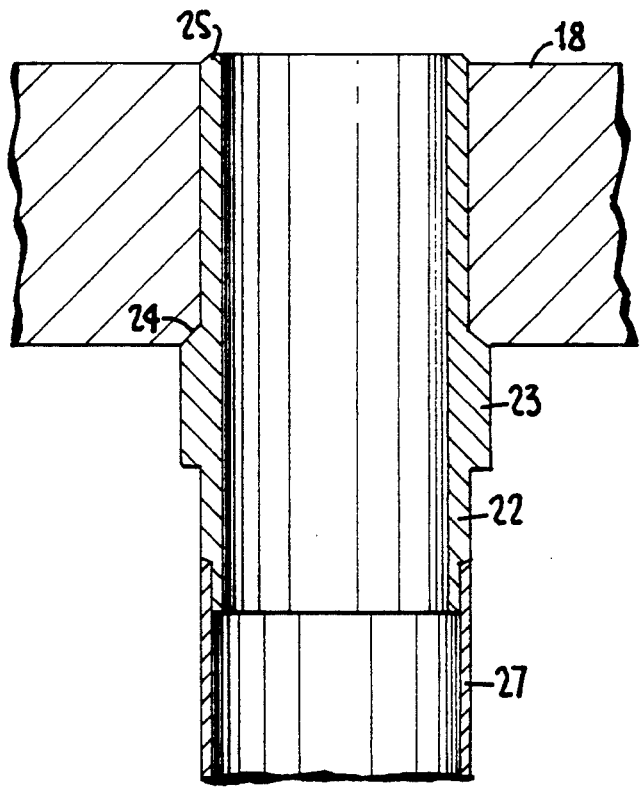
FIG. 9 is an enlarged sectional view of a portion of the removable top nozzle assembly of this invention showing the top nozzle tubular insert support member.

Each of the interior circular openings 19, marked as 19' in FIG. 3, of the adaptor plate 18 contain a top nozzle tubular insert support member 22 illustrated in FIGS. 7-9. As best illustrated in FIG. 9, the tubular insert support member 22 is secured to a tubular insert sleeve 27 by a circumferential weld and has an enlarged collar section 23 of an outside diameter slightly greater than the inside diameter of circular opening 19'. The upper surface of the enlarged collar section 23 is chamfered to mate with a chamfer 24 at the bottom of the circular opening 19'. The portion of the tubular insert support member 22 above the enlarged collar section 23 is of a diameter just slightly less than the internal diameter of the circular opening 19' to provide a smooth slip fit of the insert support member 22 into the opening 19''. The top end 25 of the tubular insert support member 22 is also preferably chamfered and projects slightly above the top surface of the adaptor plate 18, as illustrated in FIG. 9. This slight projection of the top end 25 of the tubular insert members 22 allow for a easy and simple alignment of the top nozzle assembly 12 during its reassembly.

The plurality of tubular insert support members 22 provide a stable support for the removable top nozzle assembly 12 as well as greatly simplify the axial alignment of the top nozzle assembly 12 during the reassembly of the fuel element assembly 11 after replacement of a fuel rod. Since the adaptor plate 18 is designed to fit over the insert support members 22 as a slip fit, there is little chance of impediment when the top nozzle assembly 12 needs to be removed. As a result, routine removal, alignment and seating of the top nozzle assembly 12 can be easily accomplished with little difficulty.

The tubular insert support members 22 are durable and maintain the top nozzle assembly 12 level and at a proper elevation. These insert support members 22 are more resistant to damage than the prior art split insert designs.

The tubular insert support members 22, being positioned in the interior openings 19' in the adaptor plate 18, will carry only compressive stresses transmitted through the collar 23. When the entire fuel element assembly 11 is being lifted and removed from the core for a fuel rod replacement, the lifting loads (tensile) are applied to the adaptor plate 18 only at the locations marked 19''. By moving the lifting loads outwardly to the periphery of the top nozzle assembly 12, the bending moments and stresses in the adaptor plate 18 are reduced.

As shown in FIG. 3, each of the peripheral circular openings 19 in the adaptor plate 18, marked as 19'' in FIG. 3, contain a quick release top nozzle joint mechanism 26 to provide a simple, reliable means for the disassembly and assembly of the removable top nozzle assembly 12.

Figure 6:
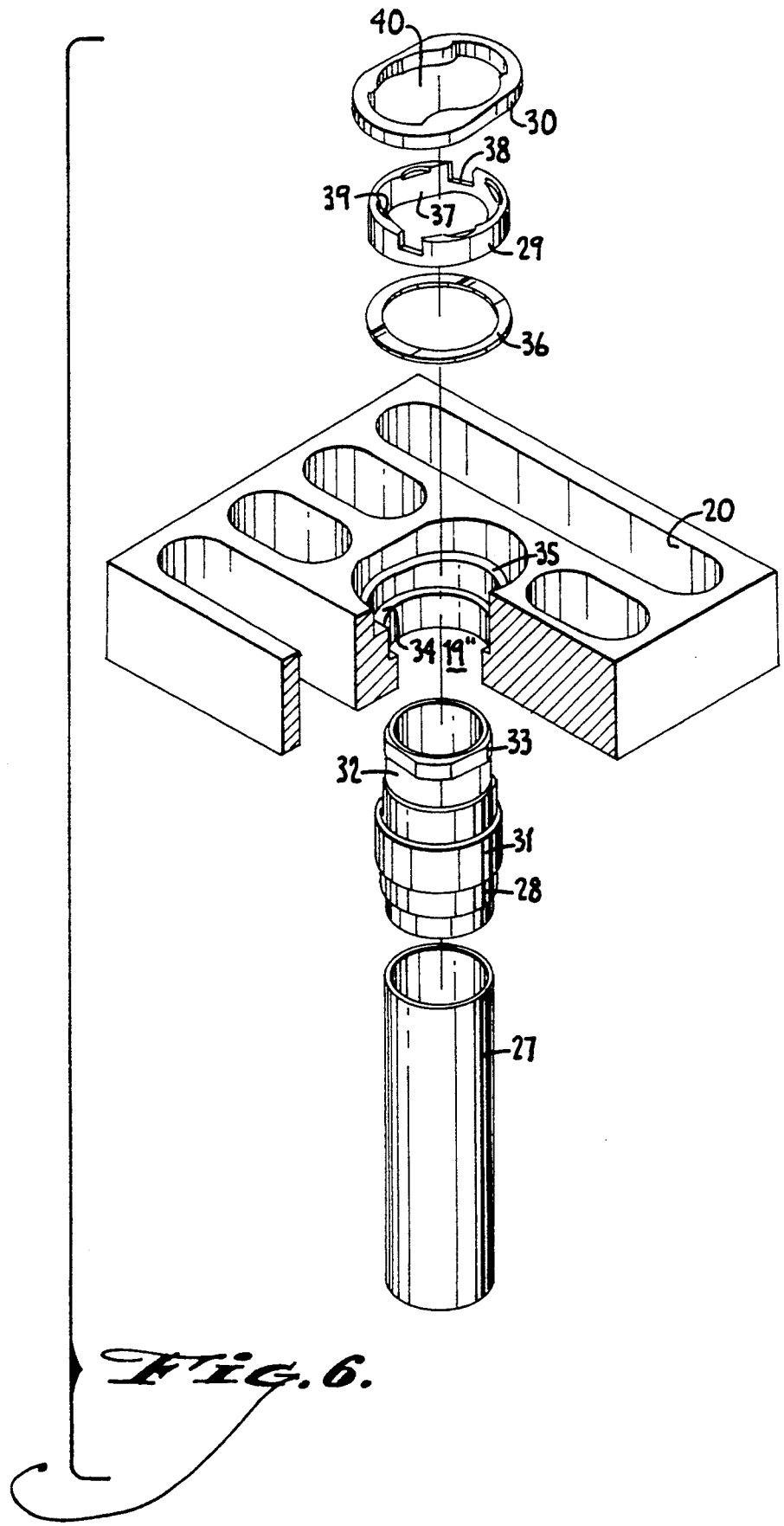
FIG. 6 is an isometric exploded view, partly in section, of a portion of the removable top nozzle assembly of this invention to illustrate the components of the quick release top nozzle joint.

The principal components of the quick release joint mechanism 26 are best illustrated in FIG. 6 and comprise a tubular insert sleeve 27 secured to the top of a thimble tube 15 by a series of mechanical bulges, a tubular lock insert 28 secured to the top of the tubular insert sleeve 27 with a circumferential weld, a spring washer 36, a lock ring 29 and a retainer ring 30. The exterior of the tubular lock insert 28 is of a diameter slightly less than the inside diameter of the circular opening 19'' to provide a smooth slip fit and is provided with an enlarged support collar 31 of a diameter slightly larger than the inside diameter of the circular opening 19''. The upper portion of the exterior of the tubular lock insert 28 is also provided with a circumferential groove 32 overlaid with four flat faces that form four lobes 33 on the leading end of the tubular lock insert 28.

The upper portion of the circular opening 19'' in the adaptor plate 18 is provided with a pair of counterbored annular surfaces 34 and 35 adapted to receive the spring washer 36, the lock ring 29 and the retainer ring 30. When the adaptor plate 18 is lowered onto the upper portion of each of the tubular lock inserts 28, it will be evenly supported on the support collars 31, with the upper portions of the tubular lock inserts 28 fitted within the peripheral circular openings 19''. The thin spring washer 36 placed over the leading end of the lock insert 28 rests on the annular surface 34 and applies a force up against the underside of the lock ring 29 to maintain it in a locked position. The bore of the lock ring 29 is slightly larger than the outside cross section of the lobes 33 on the upper portion of the tubular lock insert 28 and is provided with four flat interior faces 37. The lock ring 29 also has a pair of notches 38 and its top surface is provided with semi-circular, cut-out surfaces 39.

The top annular counterbored surface 35 of the adaptor plate 18 provides a recess that is fitted with the retainer ring 30 which is welded permanently in place to keep the lock ring 29 and the spring washer 36 permanently within the opening 19". The retainer ring 30 is provided with a central opening 40 designed to allow access from the top of the adaptor plate 18 for a spanner wrench tool that engages the pair of notches 38 on the lock ring 29 and is able to rotate the lock ring 29 a one-eighth turn. This rotation orients the four flat interior faces of the lock ring 29 directly under the lobes 33 of the tubular lock insert 28 and reduces the joint lateral clearance to a minimum. The lobes 33 of the lock insert 28 then reside in the semi-circular cut out surfaces 39 of the lock ring 29 and the upward pressure provided by the spring washer 36 prevents any rotation of the lock ring 29 without use of the spanner wrench tool.

FIGS. 4a, 4b, 5a and 5b illustrate the quick release top nozzle joint mechanism 26 in both the unlocked and locked positions.

Figures 1A, 1B:
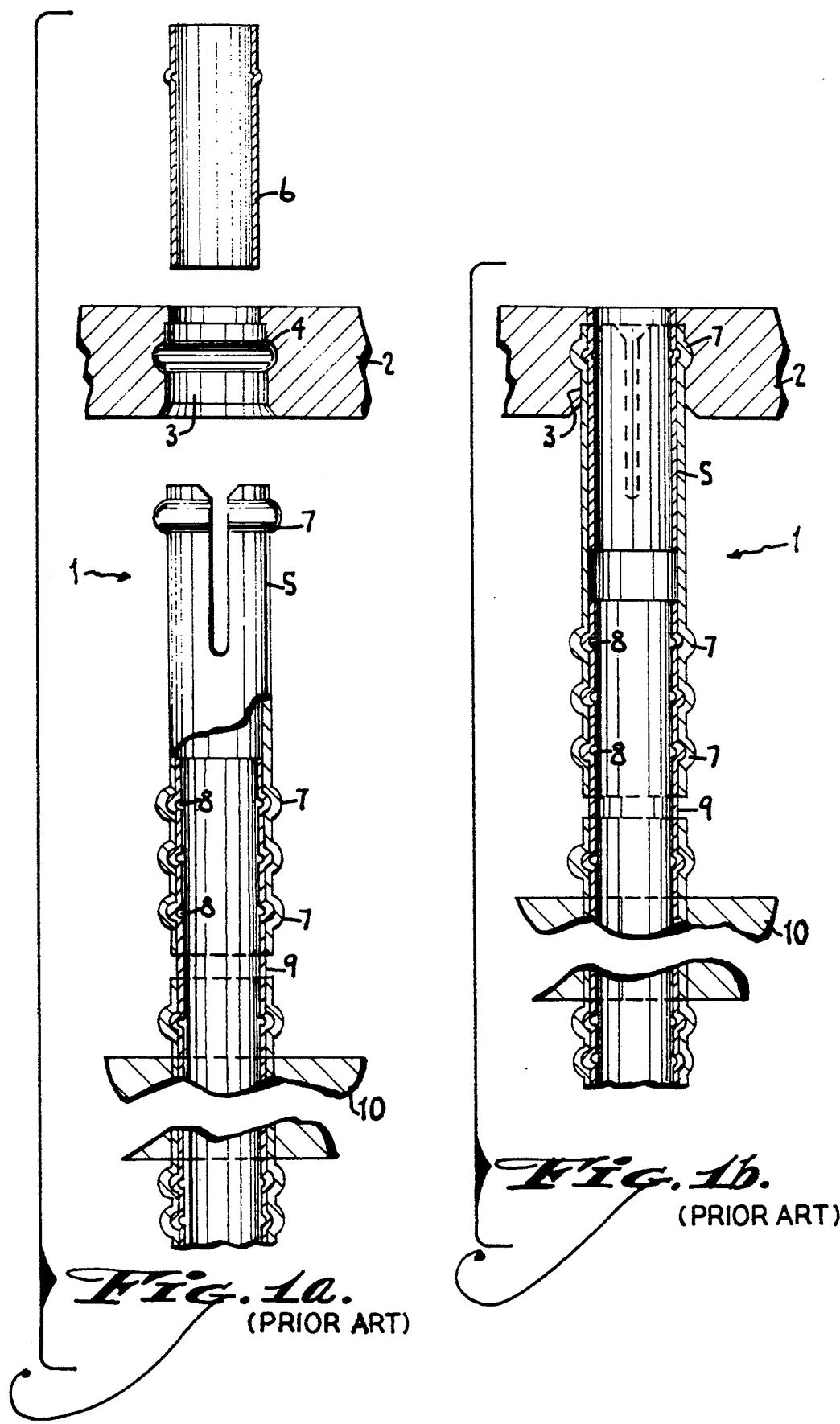
FIG. 1a is a exploded view of a typical prior art removable top nozzle assembly, partly in section, to illustrate the various components used in such an assembly.
FIG. 1b is an assembled view of a typical prior art removable top nozzle assembly, partly in section, to illustrate the manner in which the various components used in such an assembly are assembled together.

This invention offers a number of advantages over the prior art removable top nozzle assembly 1 illustrated in FIGS. 1a and 1b. First, the top nozzle assembly 12 of this invention is easier and more quickly removed and reinstalled than the prior art assembly and requires a minimal amount of force. Second, there are no loose or removable parts, that could be lost or damaged. Third, the inserts that fit within the circular openings in the adaptor plate are stronger and more durable than the split inserts used in the prior art top nozzle assembly. Fourth, the tooling requirements for on site disassembly and reassembly are considerably less, requiring less equipment cost, less set-up time and a smaller maintenance crew size. Fifth, this invention results in improved axial joint stiffness permitting a reduction in the total number of joints needed in the removable top nozzle assembly and improves the stresses in the adaptor plate. Sixth, this invention provides improved lateral load stability when the fuel element assembly is being lifted and moved.

While we have shown this invention by illustrating and describing the preferred embodiment of it, we have done this by way of example, and are not to be limited thereby as there are modifications and adaptions that could be made within the teachings and scope of this invention.

What is claimed is:

1. A quick release removable top nozzle assembly for use in a nuclear fuel element assembly comprising a top plate member, an enclosure frame and an adaptor plate having a plurality of spaced openings therein, a plurality of tubular insert support members each adapted to fit within a selected opening in the adaptor plate, each tubular insert support member having an enlarged collar section adapted to contact and support the underside of the adaptor plate, and a plurality of quick release joints, each quick release joint adapted to fit within a selected opening in the adaptor plate, each quick release joint having a tubular lock insert adapted to fit within the selected opening and having a circumferential groove and a plurality of lobes above the groove, and a lock ring retained in a recess in the top of the adaptor plate by a retainer ring, the lock ring being adapted to rotatably engage the circumferential groove and the lobes, whereby rotation of the lock ring locks or releases the tubular lock insert from the selected opening of the adaptor plate.

2. The top nozzle assembly of claim 1 in which the tubular insert support members fit within selected openings in the interior of the adaptor plate and the tubular lock inserts fit within selected openings near the periphery of the adaptor plate.

3. The top nozzle assembly of claim 1 in which rotation of the lock ring one-eighth of a turn will lock or unlock the quick release joint.

4. The top nozzle assembly of claim 1 in which the lock ring is retained in the recess by a retainer ring welded to the top of the adaptor plate.

5. The top nozzle assembly of claim 1 in which a spring washer is placed between the recess in the adaptor plate and the underside of the lock ring.

6. The top nozzle assembly of claim 1 in which the leading end of the tubular insert support member projects slightly above the top surface of the adaptor plate.

7. The top nozzle assembly of claim 1 in which the top of the enlarged collar section of the tubular insert support member is chamfered.

8. A tubular insert support member adapted to fit within a selected opening of a top nozzle adaptor plate used in a nuclear fuel element assembly, the insert support member having an enlarged collar section adapted to contact and support the underside of the adaptor plate.

9. A quick release joint adapted to fit within a selected opening of a top nozzle adaptor plate used in a nuclear fuel element assembly, comprising a tubular lock insert adapted to fit within the selected opening and having a circumferential groove and a plurality of lobes above the groove, and a lock ring adapted to be retained in a recess in the top of the adaptor plate by a retainer ring, the lock ring being adapted to rotatably engage the circumferential groove and the lobes, whereby rotation of the lock ring locks or releases the tubular lock insert from the selected opening of the adaptor plate.

10. The quick release joint of claim 9 in which a spring washer is placed between the adaptor plate and the underside of the lock ring.

11. The quick release joint of claim 9 in which the lock ring is provided with semi-circular cut out portions to retain the lobes of the lock insert.

* * * * *